May 9, 1950
F. PETERS
2,507,319
BOX OR CONTAINER
Filed Aug. 23, 1946
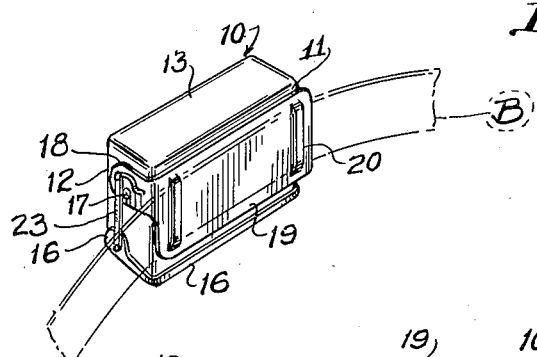
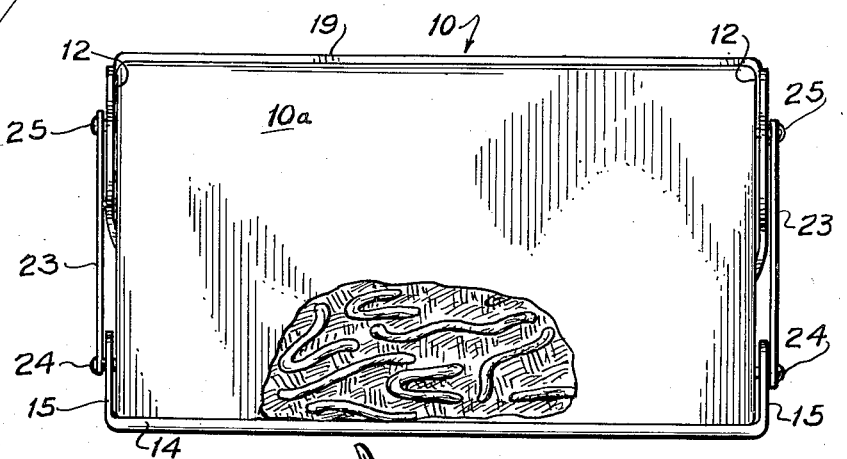
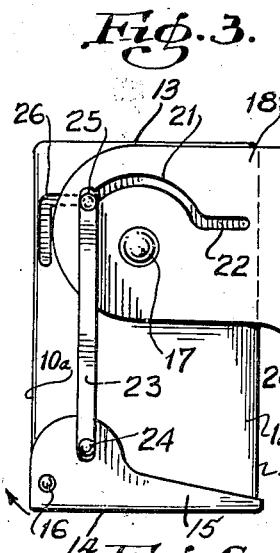 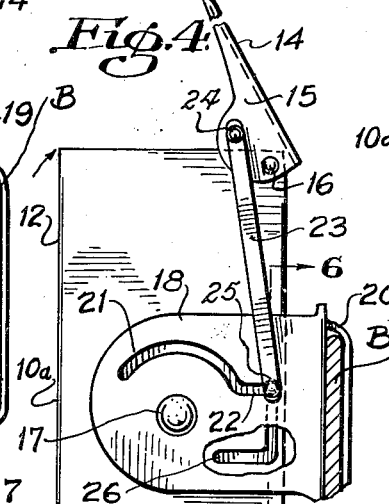 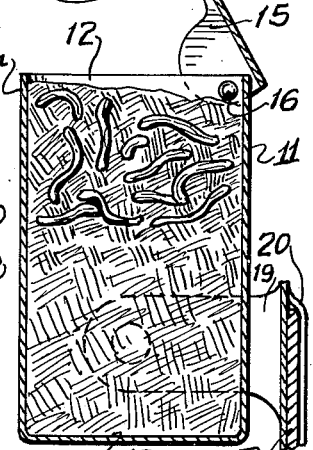
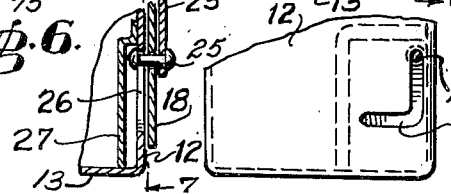
INVENTOR.
Fred Peters
BY
Martin P. Smitt
ATTORNEY.

Patented May 9, 1950

2,507,319

UNITED STATES PATENT OFFICE 2,507,319

BOX OR CONTAINER

Fred Peters, Hawthorne, Calif.

Application August 23, 1946, Serial No. 692,450

2 Claims. (Cl. 43—55)

My invention relates to a box or receptacle especially designed as a convenient container and carrier for worms used as fish bait.

Earth worms used as fish bait are generally carried in a can or container filled or partially filled with earth, and when so carried, the worms invariably crawl downward so as to occupy that portion of the earth immediately adjacent the bottom of the box and thus, the fisherman, when requiring a worm to bait his hook, must either dump the earth and worms from the box, or dig down through the earth to the area occupied by the worms. These operations involve considerable time in addition to being more or less messy, and it is the principal object of my invention to provide a simple, practical and inexpensive bait carrying box or container that may be conveniently inverted and opened, thus giving ready access to that portion of the earth occupied by the worms while the box is in its normal position.

The hinged or pivoted cover for the box normally closes the bottom thereof, and it is one of the objects of my invention to mount said box and its cover, so that when the box is inverted to bring the worm occupied area of the earth uppermost, the cover will be automatically swung open, so as to give ready access to the earth and worms.

With the foregoing and other objects in view, my invention consists in certain novel features of construction and arrangement of parts which will be hereinafter more fully described and claimed and illustrated in the accompanying drawings, in which:

Fig. 1 is a perspective view of the bait box with dotted lines showing the belt or strap on which same is mounted.

Fig. 2 is a front elevational view of the box.

Fig. 3 is an end elevational view showing the box as normally carried on a belt or strap.

Fig. 4 is an end elevation and showing box inverted and the cover raised in open position.

Fig. 5 is a vertical section of the box in inverted position, with the cover in open position.

Fig. 6 is a detail vertical section taken on the line 6—6 of Fig. 4.

Fig. 7 is a detail section taken on the line 7—7 of Fig. 6.

Referring by numerals to the accompanying drawings, particularly Figs. 1 to 6 inclusive, which show the invention embodied in a bait box, 10 designates a rectangular container having front and rear walls 10a and 11 respectively, end walls 12 and top 13.

When in normal position as shown in Figs. 1, 2 and 3, the opening between the lower edges of walls 10a, 11, 12 is closed by a plate 14, having upstanding flanges 15 on its ends and the latter are pivoted at 16, to the outer faces of end walls 12 near their lower front corners.

Pivoted at 17, to the upper central portions of end walls 12, are ears 18, of a plate 19 that is positioned to the rear of and parallel with rear wall 11.

Plate 19 and its ears 18 provide a support for the pivoted box and stamped outwardly from said plate near its ends are narrow vertically disposed straps 20, beneath which passes the belt or strap B, used in supporting the box on the user's body.

Formed in one of the ears 18 above and concentric with pivot 17 is a slot 21, and extending from the rear end thereof a short distance rearwardly toward plate 19, is horizontal slot 22.

The lower end of a link 23 is pivotally connected at 24 and also at a short distance from pivot 16 to the flange 15; that is, on the same end of the box with the ear having the slots 21 and 22, and a headed pivot pin 25 projects from the upper end of said link through slot 21 and through an inverted L-shaped slot 26 that is formed through the upper front portion of the adjacent end wall 12.

The leakage of earth through slot 26 is prevented by a small plate 27, secured to the inner face of the end wall 12 and which covers said slot. Normally the box is carried by a belt on a strap, as shown in Figs. 1, 2 and 3 with plate 14 closing the lower end of said box and when so positioned and carried, the worms crawl into the lower strata or portion of the earth within said box, as seen in Fig. 2.

In order to quickly and conveniently obtain a worm to bait his hook, the fisherman engages and swings the box on its pivots 17 outwardly through an arc of 180°, during which movement, pivot pin 25 first traverses arcuate slot 21, and then traverses slot 22.

When traversing slot 22, pin 25 also traverses the lateral portion of slot 26, and upon reaching the end thereof, said pin passes up through the vertical portion of said slot 26, during which travel, cover 14 is swung into full open position. (See Figs. 4 and 5.)

Thus the box is inverted so as to bring that portion of the earth containing the worms to the top, thus enabling the facile removal of a worm or worms.

Outward and downward swinging movement imparted to the box brings about a reversal of the movement just described with the covering closing first and the box then returning to its normal position.

Various minor changes in the size, form and construction of the various parts of my improved box or container may be made and substituted for those herein shown and described, without departing from the spirit of the invention, the scope of which is set forth in the appended claims.

I claim as my invention:

1. The combination with a support comprising a plate and ears projecting at right angles from the ends of said plate, of a box disposed between and pivoted to said ears, a cover pivoted to and normally closing the open lower end of said box, and links pivotally connected to said cover at points offset from the pivot points thereof, said ears being provided above the pivotal points for the box with slots having arcuate and straight portions, the end walls of the box being provided in their upper front corner portions with inverted L-shaped slots and pins carried by the upper end of said links and extending through the slots in said ears and in the end walls of the box.

2. The combination as set forth in claim 1 with plates secured to the inner faces of the end walls of said box, and covering the slots therein.

FRED PETERS.

REFERENCES CITED

The following references are of record in the file of this patent:

UNITED STATES PATENTS

| Number | Name | Date |
| --- | --- | --- |
| 768,579 | Bragunier | Aug. 30, 1904 |
| 875,270 | Irish | Dec. 31, 1907 |
| 1,150,776 | Lamb | Aug. 17, 1915 |

FOREIGN PATENTS

| Number | Country | Date |
| --- | --- | --- |
| 419,222 | Great Britain | Nov. 8, 1934 |
| 489,724 | Great Britain | Aug. 3, 1938 |
| 103,275 | Australia | Feb. 15, 1938 |